3,246,056
PRODUCTION OF LOW-PERMEABILITY, HIGH-DENSITY, CARBON AND GRAPHITE BODIES
Frederick L. Shea, Jr., Arlington Heights, and Glenroy Stecker, Morton Grove, Ill., assignors to Great Lakes Carbon Corporation, New York, N.Y., a corporation of Delaware
Filed June 25, 1962, Ser. No. 204,922
23 Claims. (Cl. 264—29)

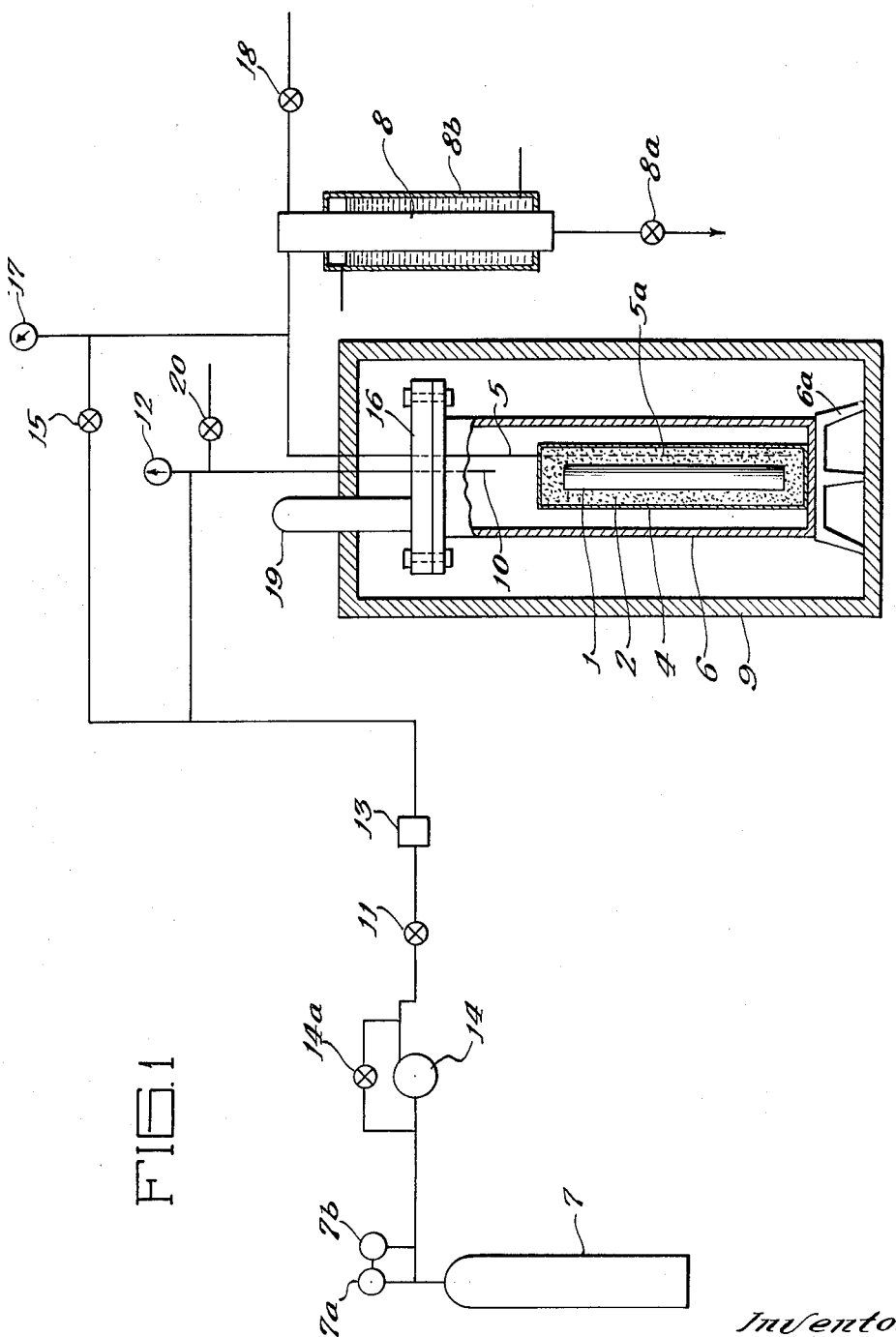

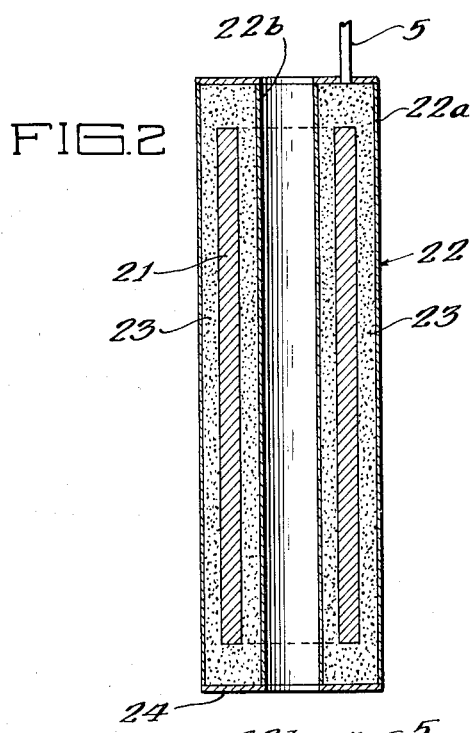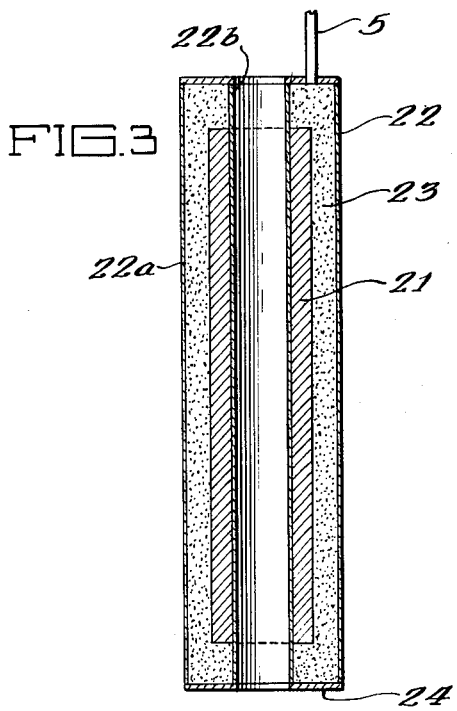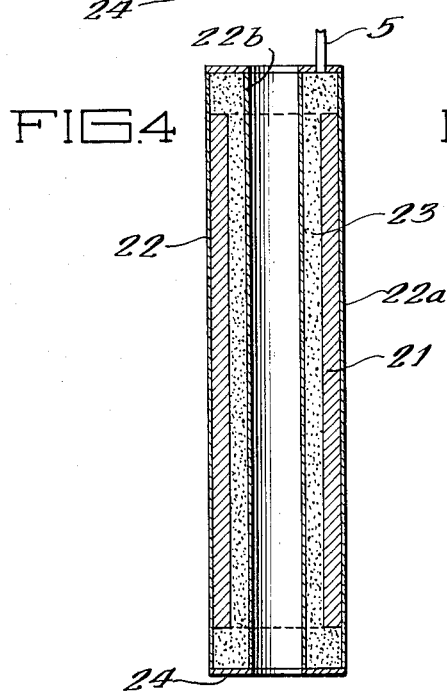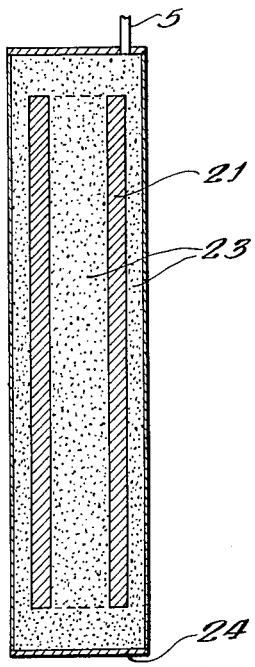

This invention relates to a novel process for the production of baked carbon bodies, and also the production of graphitized bodies therefrom.

In the typical manufacture of carbon bodies, finely powdered carbon such as calcined coke or graphite flour is mixed with a cokable binder, usually a fusible material such as pitch, and the plastic mixture formed into green shaped masses or bodies by molding or extrusion. These green shaped bodies are then baked to coke the binder. The graphite bodies may then be produced by heating the baked carbon bodies to a graphitizing temperature.

For many purposes it is desirable to produce carbon or graphite bodies of high density and low permeability and porosity. However when employing conventional baking techniques where no or only nominal pressures are applied to the shaped green masses during baking, only relatively low densities are achieved in the final baked or graphitized products, unless resort is made to special techniques involving additional processing steps such as impregnation after baking and re-baking, etc. Employing "green" bodies of low initial porosity along with conventional baking techniques in order to try to produce baked bodies of high density gives rise to fairly high percentages of flaws or fissures in the baked products.

It is an object of the present invention to produce baked carbon bodies having high apparent densities, low porosity and permeability and no or a minimum of flaws and fissures. It is also an object of this invention to accomplish this utilizing a novel fluid-pressure type of heating process which is easily controllable and adaptable to various charges.

It is another object of the present invention to produce, by the novel processes of this invention, carbon bodies having the foregoing described properties, which carbon bodies may also be in the form of cylindrical rods or hollow cylindrical tubes or other desired shapes.

It is a further object of the invention to produce, if desired, graphite bodies from the above described baked carbon masses, which graphite bodies also have higher than conventional densities.

It is a finding of the present invention that these and other objects may be achieved if a formed carbonaceous mass capable of fusing and developing a permanent carbon bond, such as a shaped green mass of powdered carbon and fusible cokable binder, is subjected, while being heat treated, to pressure techniques described in detail hereinafter, while the formed carbonaceous mass or shaped green mass is in a deformable, impermeable envelope in a fluid pressure system capable of providing widely varying controlled fluid pressures within said envelope, outside said envelope, and differential pressures between same. Preferably the shaped green carbonaceous mass is held in position in the impermeable envelope by surrounding a portion or all of it with a refractory powder such as carbon grist or an especially sized aggregate consisting of coke, or graphite, or other refractory particles. Such particles may be fine right near the body being heat-treated and coarser grained further away in order to facilitate escape of volatiles. Preferably also, means are provided for reducing or increasing the fluid pressure within said envelope and for reducing or increasing the fluid pressure outside said envelope—and at any stage of the heat-treating cycle—viz. before or after the formed carbonaceous mass or shaped green body being heated reaches its highest temperature. Typically the differential pressure will be increased, over that initially employed when heating the body, by reducing the pressure within said envelope before the pressure outside said envelope is reduced; and, preferably also, before any substantial solidification or setting of the formed carbonaceous mass takes place. At some time during the heat-treating cycle, either during the upheat stage, or while the temperature of the body is maintained substantially constant, or during the stage when the temperature of the body being processed starts to go down, or during any or all of these stages, but typically while the body being processed is still "plastic" and capable of being consolidated, or possesses a high degree of "formability" or "moldability," a pressure differential exists between the pressure outside the encasing, deformable, impermeable envelope and the pressure inside the envelope, with that outside the higher, so that considerable densifying force or power is exerted upon the body while it is in a state very receptive to densification and before any substantial solidification or setting of the "plastic" mass has taken place. This densifying force is mechanical in nature, it being exerted directly upon the body being processed either by the impermeable envelope or the packing material within said envelope or both, but is the result of or provided indirectly by the above described fluid pressure system.

The maximum temperature to which the shaped green carbon mass is heated while in the impermeable envelope is generally about 800° C.; and a typical temperature employed is about 600° C. although these may vary depending upon apparatus design. The rate of heating the shaped mass is preferably not more than about 100° C. per hour although this is dependent upon a number of factors, such as size of body being processed, the materials from which the body is made and their volatile content, etc. After the above heat treatment, the carbon masses are generally in a semi-baked or baked state and of high density and low porosity and permeability. They may then be removed from within the impermeable envelopes and further heated to a baking temperature, for example, to a temperature between about 800° C. and 1250° C., if they have not already been heated to a sufficiently high temperature; then also, if desired, to a graphitizing temperature, for example, to a temperature between about 2000° C. and about 3000° C. This latter processing may be in accordance with conventional baking and/or graphitizing techniques. Also, if desired, conventional impregnation treatment, for example with pitch, may be interposed between baking and re-baking or between baking and graphitizing to further increase the density of the final baked or graphitized product. This procedure, however, does not comprise the inventive aspect of this process, and even without this treatment the density of the bodies produced is unusually high and their permeability unusually low as compared to conventional unimpregnated baked or graphitized bodies.

Further understanding of this invention and of the means of carrying it out will be facilitated by referring to the drawings wherein:

FIGURE 1 is a schematic drawing of a typical apparatus for carrying out the invention;

FIGURES 2, 3, 4, and 5 are vertical sectional views of several alternative sample containing means and packing arrangements which are specially adapted to the baking of carbon bodies in tube form.

In carrying out the invention a suitable mixture of granular or powdery carbon material and a binder is formed into a body of the desired shape, such as a solid cylinder 1, shown in cross-section in FIGURE 1. A pressure deformable or responsive, heat conducting, fluid impervious envelope 4, typically made from copper sheathing of suitable thickness, is constructed of such a size and shape so that the green carbon body to be heated may be placed in same and, preferably, entirely surrounded by a heat-stable, heat-conducting refractory packing material 2, such as graphite flour, within said envelope. This envelope 4 typically may be sausage shaped with somewhat thickened ends; or in the form of a cylindrical can having brass plugs at its bottom and top and welded or silver soldered to same or mechanically clamped to close the ends to make it gas tight. The envelope itself can be formed from a single piece or a number of pieces of sheathing of the desired length and by interlocking or overlapping the edges and then soldering same. Pressure transmitting means 5 are connected in a similar gas-tight manner through an opening in the top of the can or envelope 4 in order that the gaseous pressure within the envelope may be controlled. This fluid pressure within the envelope will always be of the gaseous type and may be designated as $P_I$.

The pressure deformable, or responsive, fluid impervious or impermeable (except for intentional opening for line 5) envelope 4 is mounted in any suitable manner in pressure vessel 6, which is so designed and constructed as to be able to withstand the temperatures and pressures encountered in carrying out the processes of the invention. These temperatures and pressures will be discussed in more detail hereinafter.

As depicted schematically in FIGURE 1, the pressure vessel 6, suitably supported such as by legs 6a, is connected, by appropriate pressure lines, between a fluid pressure supply system 7–14 (such as tank 7 containing nitrogen gas which gas is put under high pressure by compressor 14), and a means 8 for receiving the volatiles which are given off from the formed mass during or after the heat treatment operation. Tank 7 is equipped with a standard line pressure reducing valve and two gauges 7a and 7b to measure the tank pressure and line pressure respectively. Compressor 14 is provided with a pressure regulated by-pass valve 14a. Envelope 4 may be vented by vent means 5 which is the same means employed to transmit the pressure within the envelope or the internal pressure. Vent means 5 must of course be connected through an opening in the envelope, typically in the top thereof, and may also extend for a substantial distance within the envelope and contain perforations therein such as designated by 5a. Means 8 may be surrounded by a water-cooled jacket 8b to assist in condensing the volatiles. Valve 8a is provided to keep volatile receiving means 8 under pressure and also to drain off condensed volatiles when desired.

The fluid pressure system can utilize several different materials in order to provide the requisite gaseous or fluid-type pressure. The materials, however, should preferably be stable to temperatures at least as high as 600° C. Gases such as nitrogen, argon or flue gas, etc., are suitable, and may be employed for both the internal pressure within said impermeable envelope 4 and for the external pressure which is outside said envelope but within the pressure vessel 6.

In FIGURE 1 controlled internal pressure is provided or supplied by pressure line 5 and external pressure by line 10. These lines are provided with suitable pressure inlet valves such as 15 and 11, or vent valves 18 and 20 to provide for controlled internal and external pressures. The pressure exerted upon the body is mechanical in nature and is the difference between the external pressure and the internal pressure. This differential pressure may be described by the equation $P_D = P_E - P_I$. This differential mechanical pressure will preferably be transmitted to the body through a refractory material such as 2 or 23, although it may sometimes be transmitted by the envelope 4 (or 22a or 22b) directly.

Generally a relatively high internal pressure will be provided within the envelope 4. (Gage 17 indicates this pressure.) The purpose of this high internal pressure is to keep the volume of the gases leaving body 1 small so that only small, rather than large, voids are formed in the body. After the body has been heat treated for the desired length of time and to the desired temperature, the pressure ($P_I$) within the envelope 4 is typcially first lowered to permit escape of volatiles and then the external pressure ($P_E$) is also lowered. The differential pressure ($P_D$), which as aforesaid is mechanical in nature, is of course increased during the interim that the $P_E$ is kept constant and the $P_I$ lowered. In order to avoid bursting of the deformable envelope, $P_I$ is never greater than $P_E$ during any part of the main heat-treating cycle.

In some cases it might be desirable to surround the envelope, after or while it is inserted in the pressure vessel, with a liquid, such as a low melting lead alloy, in order to have a highly efficient heat transfer system. In such a case, the external pressure acting upon the envelope, will be derived from this medium as well as the gas pressure supplied by line 10. Fluid pressure is meant to connote either gas or liquid pressure, but the internal pressure transmitted by line 5 will always be of the gas type. The means 8 for collecting the volatiles may typically be a cold trap which is so designed that it will receive, collect, and condense the volatiles while, at the same time, being pressurized and pressure connected to the interior of the envelope 4 containing the carbon body 1 to be heated. This connection is made by element 5 which serves both as a pressure transmitting means and as a vent tube for the sample containing envelope.

After the sample has been placed in the gas impervious envelope or the sample containing means 4 and, typically, entirely surrounded by refractory material 2, the pressure transmitting means 5 is then coupled between the top of same and the cold trap through the cover 16 of pressure vessel 6. Cover 16 is screwed into or otherwise connected to pressure vessel 6 in a pressure tight manner and the fittings and couplings through said cover are also pressure tight. The cover of the pressure vessel 6 also couples the high fluid pressure means 7–14 to pressure transmitting lines 10 and 5. A suitable valve 11 is provided to control the amount of pressure in pressure vessel 6 which is exerted upon the outside of the gas impervious envelope 4 (or which is transmitted to the liquid metal, if a liquid metal is employed). Gauge 12 indicates what this pressure is at any given moment. Pressure relief valve 13 is to insure safety. Valve 11 controls or limits both the internal and external pressures which are provided to the system; but valve 15 provides for additional control of the internal pressure.

In a typical arangement pressure vessel 6 is situated within a furnace 9 so that the formed carbon body 1 within the metallic envelope 4 and within the pressure vessel may be heated to the desired temperature. The furnace may typically be gas fired or heated by induction. Rupture disc 19 guards against excessive or dangerous pressures in the pressure vessel 6. The pressure vessel is constructed of a suitable material, such as stainless steel, and of sufficient thickness to readily withstand the temperatures and pressures encountered.

Other means for heating the pressure vessel, such as heating coils directly surrounding same, may also be employed. Or a cold wall vessel may be used in which the vessel walls may be cooled externally or internally by circulating fluids, or by radiation, or other means and an electric furnace placed around the deformable envelope and insulated thermally from the inner wall of the pressure vessel.

Gauge 17 records the total of the fluid-pressure-passing valve 15 as well as the pressure caused by the evolution of volatiles from the green body-formed carbonaceous mass being heated. Valve 18 permits the venting of these volatiles to atmosphere or elsewhere and the reduction of these pressures to any desired level.

As previously stated, at some time during the heat treating cycle a pressure differential between the external and internal pressures, with the former the higher, is caused to exist. As is apparent from the description of FIGURE 1, this may readily be accomplished and in a number of ways. For example the pressure levels might be set so that both the external ($P_E$) and internal pressures ($P_I$) are relatively high initially such as 2200 and 1800 p.s.i.g. respectively with an initial differential pressure ($P_D$) of 400 p.s.i.g., and at the desired point or interval in the cycle, the external pressure kept constant and the internal pressure vented to atmosphere, or the internal pressure kept constant and the external pressure raised, so that the differential pressure ($P_D$) goes from 400 p.s.i.g. to, for example, about 1200 p.s.i.g. or higher. Or one might operate with initial high external and relatively low internal, keeping the differential and/or the pressures the same throughout the cycle; or with relatively low initial external and internal but with subsequent increase in the external, etc. The absolute internal and external pressures employed may be varied widely so long as the limitations of the particular system are not exceeded. The differential pressure may also vary widely such as from as little difference as about 50 p.s.i.g. or 100 p.s.i.g. to as much pressure difference as about 5000 p.s.i.g. but pressures or pressure differentials much higher than this may also be employed. The amount of this differential pressure employed in turn will depend somewhat on the characteristics of the body being heat treated, the stage of the process at which it is applied or determined (it typically being maximum during the venting portion of the process as will become clearer from a consideration of the examples), and also upon the pressure withstanding capabilities of the fluid impermeable envelope 4. The system is so designed and the envelope so constructed that it is very resistant to bursting from the fluid pressures (external pressure equal to or greater than internal pressure) exerted thereupon and therein, chiefly because the pressure load is borne by the body being heat treated or by the packing materials surrounding same. The impermeable membrane is pushed against the solid body or the packing materials rather than against empty space and the membrane merely has to be sufficiently strong or thick that it can adjust to a minor percentage of body shrinkage, or not be pierced by packing materials which might have relatively sharp edges, etc. At the same time the envelope is, within these limits, readily deformable by or responsive to the differential pressure acting upon same, so that this differential fluid type pressure (which is converted to mechanical pressure by the envelope) may be transmitted against the body being heat treated or against the refractory powder packing material placed within said envelope and around the body being heat treated. The relationship typically is such that a substantially uniform and isostatic mechanical pressure at any given moment is applied in all directions against the carbonaceous body being heated. The relationship is such also that many of the pores of the carbonaceous body, and fissures which might occur during its heat treatment, are closed or prevented from developing due to mechanical pressure holding it intact.

In a typical example, the body is heated according to any suitable heat treating schedule such as about 100° C. per hour to about 600° C., during or after which (but before the body has substantially hardened, or solidified, or "set") venting is carried out, by first reducing the pressure within the gas impervious envelope 4 (thereby bringing the differential pressure to its maximum), and then by reducing the pressure within the pressure vessel 6. This is accomplished by opening the valve 18 and then the bleeding valve 20. A typical venting schedule comprises reducing the internal pressure at a logarithmic decay rate such that one-tenth of the initial pressure is attained within one hour, for example from 1800 p.s.i.g. to 180 p.s.i.g. followed by relatively rapid venting to atmospheric pressure. The external pressure is then vented to atmopheric pressure at a convenient rate. This venting may also optionally be carried out in a manner such that the pressure in each of the lines is released gradually and at an even rate over a period of about two hours, but maintaining the differential pressure constant, after which the pressure lines may be bled rapidly to atmospheric pressure. Pressure differential control may be carried out in many other suitable ways which will be apparent to one skilled in the art and are considered within the scope of the invention.

The techniques of the invention are also adaptable to the production of high density carbon bodies in tubular form by employing gas impervious envelope constructions and green body and packing material placements such as are illustrated in FIGURES 2, 3, 4, and 5, which figures illustrate some alternative ways of accomplishing this.

It will be noted that the envelopes employed in the invention may be in cylindrical form, or in tubular or annular form, or in spherical form, or sausage shaped, etc. The important consideration is that they be so constructed as to be capable of being coupled, in a substantially pressure-tight manner, to a pressure supply system; and that at the same time, they readily deform or comply with the fluid pressures at work upon them so that they convert these forces to mechanical forces and transmit these forces, substantially in total, without rupturing, to the refractory particles and/or the green carbon bodies being heat treated. If the envelope is too thick then it cannot effectively respond to the fluid differential pressures acting upon it. If it is too thin it may rupture during the heat treating step or it may be difficult to maintain its integrity during fabrication and hook-up to the pressure supply system. In general the envelope wall thickness will be roughly proportional to the size of the body being processed and will typically also be as thin as practical consistent with resistance to puncture or tearing or rupturing, etc. Envelope thicknesses of materials such as copper, etc., between 0.015 and 0.035 inch have been found to give essentially equivalent results for typical fluid pressures (e.g. 1800 p.s.i.g. internal pressure and 2200 p.s.i.g. external pressure) in the production of relatively small bodies (e.g. cylinders 1¼ inches in diameter and 8 inches long); but such thicknesses are intended to be suggestive only and may, as aforesaid, be varied widely depending upon the size of the bodies being processed, the pressure capabilities of the system employed, etc.

In FIGURE 2, an extruded green tube 21 is inserted in an annular shaped impermeable envelope 22, of suitable size and shape, and made from a suitable material such as copper or aluminum foil. Prior to inserting the green extruded tube a portion of the envelope at the closed end 24 will be filled with some of the selected packing media 23. The green extruded tube will then be inserted into the annulus and the void space between the outer surface of the tube and the outer wall 22a of the envelope, as well as the annular space between the inner surface of the tube, and the inner wall 22b of the envelope, will be filled with the selected packing media. Thus, in essence, the green extruded tube will be completely surrounded on all surfaces by a layer of the selected media and this in turn enclosed in an impermeable envelope. The outer and inner sheathing 22a and 22b, respectively, of the annular envelope may be of identical thickness or of different thicknesses.

The envelope 22 is then connected up to fluid pressure transmitting line 5, made pressure tight such as by silver soldering, or mechanical sealing, etc., previously discussed, and processed in essentially the same manner as is the envelope containing sample of FIGURE 1, already described.

In FIGURE 3, as in FIGURE 2, an extruded green tube 21 is inserted in an annular shaped impermeable envelope 22. In this embodiment the inner wall 22b of the envelope is directly against the inner wall of tube 21. The outer peripheral surface of tube 21 is surrounded by refractory packing 23 and then by the outer wall 22a of the envelope.

FIGURE 4 illustrates an embodiment just the reverse of FIGURE 3 the outer wall 22a of the envelope being in direct contact with the outer surface of tube 21; and the inner wall 22b being separated from the inner surface of the tube by packing 23.

FIGURE 5 shows an alternate to the use of an annulus-shaped impermeable envelope, such as employed in FIGURES 2, 3, and 4, for the processing of tubular shaped carbon bodies. In FIGURE 5 an envelope such as described for use in FIGURE 1 is employed and the green extruded tube is packed throughout its bore and also completely encased in packing media 23.

The following examples and tables are set forth in order to more fully describe the present invention and to illustrate several of the variables thereof:

sure of 400 p.s.i.g. The internal pressure was then vented to atmospheric pressure as previously described over about a 60 minute period to about 180 p.s.i.g., then rapidly vented to atmosphere (thereby bringing about a maximum differential pressure of 2200 p.s.i.g.) after which the external pressure was also vented or decreased to atmospheric pressure at a convenient rate. The shaped mixture, which possessed a green density of 1.61 grams per cubic centimeter, now possessed an apparent density of 1.85 grams per cubic centimeter. Subsequent graphitization (2500° C.) resulted in a body having an apparent density of 1.91 grams per cubic centimeter and a permeation constant to helium, at room temperature and under 40 p.s.i.g. pressure, of 0.005 cm.$^2$/sec.

By contrast a graphitized body having the same formulation and extruded and phaphitized in the same way, but baked in a conventional manner (sample of green, extruded rod placed in a stainless steel container supported and surrounded by graphite particles $-35/+65$ mesh and heated in a 7-day upheat rate to 950° C. and then slowly cooled to room temperature), had an apparent density of 1.70 grams/cc. and a permeation constant of 0.31 cm.$^2$/sec. (All permeabilities measured as indicated above.)

Example 1 was repeated with variations in the formulation of the materials from which the body was made, the thickness and shape or type of the impermeable envelope, the pressures and venting schedules employed, etc. The following examples and tables set forth these variables and the results obtained.

Example 1 was repeated employing the same formulation and the same extruded material having a "green" density of 1.61 g./cc. However, the initial pressures employed were varied as indicated in Table I which indicates the general effect of various pressures on the properties.
variables and the results obtained.

*Table 1*

| Example | Initial Pressures | | | A.D. g./cc. Semi-baked (590° C.) | Graphitized (2,500° C.) | Permeability (cm.$^2$/sec.) |
| --- | --- | --- | --- | --- | --- | --- |
| | $P_E$ (p.s.i.g.) | $P_I$ (p.s.i.g.) | $P_D$ (p.s.i.g.) | | | |
| 1 | 2,200 | 1,800 | 400 | 1.85 | 1.91 | 0.005 |
| 2 | 2,200 | 800 | 1,400 | 1.80 | 1.84 | 0.015 |
| 3 | 2,200 | 2,100 | 100 | 1.84 | (¹) | (¹) |
| 4 | 1,000 | 800 | 200 | 1.78 | 1.86 | 0.024 |
| 5 | 1,000 | 400 | 600 | 1.72 | 1.78 | 0.049 |

EXAMPLE I

A mixture was prepared of 75 parts of graphite flour, 25 parts of Thermax (a registered trademark of the R. T. Vanderbilt Company for a soft, semi-reinforcing, finely divided carbon obtained by thermal decomposition, or cracking, of natural gas), 34 parts of pitch and 6 parts of stearic acid and was extruded into a cylindrical rod; this rod was placed in a gas impervious envelope 4 of FIGURE 1, constructed of copper sheathing material having a thickness of 0.0215 inch, and was surrounded by a graphite flour packing material 2 within said envelope. The envelope was placed in a pressure vessel 6, such as shown schematically in FIGURE 1 and previously described, and the various necessary pressure connections were made. The fluid pressure system was entirely nitrogen. The formed mixture within said envelope was then heated to a temperature of about 590° C. over a period of about 6 hours; employing an external pressure from line 10 of about 2200 p.s.i.g., and a controlled internal pressure from line 5 (or from pressures from the pitch volatiles or both) of about 1800 p.s.i.g., or a differential pressure of 400 p.s.i.g.

In each of the foregoing examples, substantially immediately when the 590° C. temperature was reached, the internal pressure was gradually reduced to one-tenth of its original value over a period of 60 minutes (e.g. 800 to 80 p.s.i.g. or 2100 to 210 p.s.i.g.), in a manner as previously described, then rapidly vented to atmosphere, and then the external pressure was also vented to atmospheric pressure at a convenient rate. The 590° C. temperature (approximately) was held substantially constant during the venting step. This is also the venting technique employed in all of the examples following, unless specified otherwise.

The following examples set forth in Table II illustrate the effect of some of the process variables on extruded rods (green density 1.66 g./cc.) made from graphite-pitch mixes—no thermax being included. The mixes were prepared using 100 parts of graphite and 40 parts of pitch; the graphite being of such a size that 33⅓ parts of it had a particle size of about 55% ∓5% −200 mesh, 33⅓ parts was as least 96% −200 mesh, and the other 33⅓ parts was at least 70% −35 mesh and +65 mesh.

Table II

| Example | Initial Pressures | | | Upheat Time (hrs.) | A.D. g./cc. Semi-baked (590° C.) | Graphitized (2,500° C.) | Permeability (cm.²/sec.) |
| --- | --- | --- | --- | --- | --- | --- | --- |
| | $P_E$ (p.s.i.g.) | $P_I$ (p.s.i.g.) | $P_D$ (p.s.i.g.) | | | | |
| 6 | 2,200 | 1,800 | 400 | 3½ | 1.78 | 1.76 | 0.128 |
| 7 | 2,200 | 1,800 | 400 | 6 | 1.84 | 1.82 | 0.057 |
| 8 | 2,200 | 900 | 1,300 | 6 | 1.81 | 1.76 | 0.320 |
| 9 | 2,200 | 0 | 2,200 | 6 | 1.77 | 1.73 | 0.378 |

Upheat rates which are not too fast or too slow for attainment of optimum properties can readily be determined for particular formulations or pressures or body sizes being processed. For example, in Table II the upheat rate (3½ hours to reach 590° C.) in Example 6 was too rapid and the properties of the body produced were inferior to those of the body produced in Example 7 which was identical except that it employed an upheat rate of 6 hours to reach 590° C.

Correspondingly, optimum pressure conditions or venting schedules can also be readily determined. Tables I and II illustrate the effects of different pressure conditions. Table III illustrates the effects of various venting schedules. The same "green" extruded material as was used in Example I was used in each of the examples. Example I is repeated for purposes of comparison.

Table III

| Example | Initial Pressures | | | A.D. g./cc. | | | Venting Procedure |
| --- | --- | --- | --- | --- | --- | --- | --- |
| | $P_E$ (p.s.i.g.) | $P_I$ (p.s.i.g.) | $P_D$ (p.s.i.g.) | Green | Semibaked (590° C.) | Graphitized | |
| 1 | 2,200 | 1,800 | 400 | 1.61 | 1.85 | 1.91 | Previously described. |
| 10 | 2,200 | 1,800 | 400 | 1.61 | 1.81 | 1.81 | Same as for Example 1 but venting commenced at 475° C. rather than 590° C. |
| 11 | 1,960 | 1,800 | 160 | 1.61 | 1.70 | (¹) | Same as for Example 1 but over a 4-hour period rather than 60 min. |
| 12 | 2,040 | 1,800 | 240 | 1.61 | 1.76 | (¹) | Same as for Example 1 but pressures held substantially constant for 4 hrs. before starting to vent. |
| 13 | 2,200 | 1,800 | 400 | 1.61 | 1.70 | (¹) | Internal pressure vented to 1,000 p.s.i. in 5 minutes, then external pressure vented to 1,000 p.s.i. in 5 minutes, then both pressures together to atmospheric pressure. |

¹ Not Measured.

The foregoing table illustrates that too long a venting period, or too short a venting period, or starting to vent too soon or too late can adversely affect the properties of the bodies produced in accordance with this invention.

Several process variables were explored. For example, typical body sizes heat treated in accordance with FIGURE 1 were from 1¼ inches in diameter to 3¾ inches in diameter and for about 6 to about 12 inches in length; the packing material 2 which was employed was varied with respect to its size and kind and layer thickness, also with respect to employing mixtures such as fine particles nearest the body and coarser particles near the envelope; the thickness of the envelope 4 was varied such as between 0.008 and 0.045 inch.

Similar variations as for the FIGURE 1 arrangement were carried out with the arrangements shown in FIGURES 2–5. For example tubes were produced in accordance with each of these illustrated arrangements; the tubes varied in diameter and length; some having the same length had different diameters such as 3¾″ outside diameter x 2½″ inside diameter, or 3¼″ O.D. x 2″ I.D., or 3¾″ O.D. x 2″ I.D., etc.; also particle packing materials and sizes and arrangements were varied; envelope wall thicknesses were also varied, with the inner wall (22b) thickness sometimes the same as the outer wall (22a) thickness, or sometimes less thick or sometimes more thick, etc.

The types of carbonaceous materials or mixtures employed in making the formed carbonaceous mass were also varied widely. Some of these have already been exemplified or discussed, viz. graphite-thermax (thermal carbon black)-pitch mixtures, and graphite-pitch mixtures. Several other materials or carbonaceous mixtures were also employed in the invention including formed carbonaceous masses prepared from raw petroleum coke; or mixtures of raw petroleum coke and a plasticizing agent such as anthracene oil or creosote oil; or mixtures of calcined petroleum coke and pitch; or mixtures of calcined petroleum coke, thermax and pitch, etc. A formed body (green A.D. of 1.63 g./cc.), processed in the same manner as the body of Example 1 and from a formulation identical thereto except that calcined petroleum coke particles were employed in the place of graphite particles, and 25 parts of pitch were employed rather than 34 parts, resulted in a semi-baked (590° C.) body having an apparent density of 1.76 g./cc., and a graphitized (2500° C.) body having an apparent density of 1.88 g./cc. and a permeability constant of 0.0015 cm.²/sec. A formed carbonaceous mass of 100 parts of raw petroleum coke (about 13% volatile matter content) and 12.4 parts of anthracene oil (having a "green" A.D. of 1.18 g./cc.), when semi-baked to 590° C. had an A.D. of 1.30 g./cc., and when graphitized to 2500° C. had an A.D. of 1.89 g./cc. and a permeability constant of 0.0021 cm.²/sec. Identical formed bodies heat treated in a conventional manner resulted in graphitized bodies having the following comparative properties:

| | A.D. (g./cc.) | Permeability (cm.²/sec.) |
| --- | --- | --- |
| Calcined petroleum coke body | 1.77 | 0.25 |
| Raw petroleum coke body | 1.80 | 0.26 |

The increased densities and reduced permeabilities obtained when proceeding in accordance with this invention are readily apparent. These improvements result from this invention's novel combination of controlled internal pneumatic pressure acting within the body itself and controlled mechanical pressure acting upon the body during baking.

As is apparent from the foregoing examples, the starting materials and mixtures which may be employed in the present invention are many and varied. As already indicated, raw petroleum coke (typical volatile content 10–

20%) may sometimes be used alone in which case the fusing and developing of a permanent carbon bond, referred to in the claims, develops from within and autogenously. This is largely also the case when a plasticizing agent is employed with raw petroleum coke. More typically the starting material will be a mixture of graphite particles and binder or calcined coke particles and binder, with thermax frequently employed with either.

A few parts of stearic acid was employed in Example 1 because the pre-formed "green" body 1 was shaped by an extrusion process. It should be readily understood that other forming techniques may also be employed to prepare the "green" bodies which are to be heat treated, including molding or isostatic forming, etc.

The "formed carbonaceous mass capable of fusing and developing a permanent carbon bond" referred to in the claims is, therefore, meant to refer to any of the above materials or any suitable carbonaceous material. If an added binder is employed, it may be any material which fuses and which leaves a carbonaceous residue when heated (cokable). Typical suitable materials are pitch, coal tar, phenolic resins, furfuryl alcohol, furan-ketone condensation products, etc., and these will usually be employed in amounts from about 15 to about 50 parts per 100 parts of the powdered carbonaceous material, by weight.

It is to be understood that the invention is not limited to the specific examples which have been offered merely as illustrative and that modifications may be made within the scope of the appended claims without departing from the spirit of the invention.

We claim:

1. A method of producing a carbon body from a carbonaceous preform, a portion of said preform being capable of fusing and of developing a permanent carbon bond when heated, which comprises:
   A. surrounding said preformed carbonaceous mass with a deformable, pressure-transmitting, fluid-impermeable envelope;
   B. heat-treating said preformed carbonaceous mass for a time and to a temperature sufficient to evolve volatiles from within said mass while it is contained within said envelope; and,
   C. by means of a fluid pressure system, providing external pressure on said pressure-transmitting, fluid-impermeable envelope, and internal gaseous pressure within said envelope while said preform is heat-treated, said external pressure being greater than said internal pressure during at least a portion of the heat-treating step resulting in the application by transmission through the envelope of a mechanical pressure on said preform being heat-treated, said internal gaseous pressure being provided from a source independent of the evolving volatiles, and said independent internal gaseous pressure being provided so as to suppress the evolution of said volatiles from the carbonaceous mass while it is heat-treated.

2. A method according to claim 1 wherein refractory particles are encased between the formed carbonaceous mass and the deformable envelope.

3. A method according to claim 1 wherein pressure for said fluid pressure system is provided by a gas stable to temperatures at least as high as 600° C.

4. A method according to claim 1 wherein a part of the pressure of said fluid pressure system, outside said envelope, is provided by a liquid metal which is stable to temperatures at least as high as 600° C.

5. A method according to claim 1 wherein said preformed carbonaceous mass consists essentially of graphite and pitch.

6. A method according to claim 1 wherein said preformed carbonaceous mass is comprised substantially of raw petroleum coke.

7. A method according to claim 1 wherein said preformed carbonaceous mass is comprised of from about 65 to about 85 parts by weight of graphite, from about 35 to about 15 parts by weight of thermal carbon black, and from about 20 to about 40 parts by weight of pitch.

8. A method according to claim 1 wherein said preformed carbonaceous mass consists essentially of calcined petroleum coke and pitch.

9. A method according to claim 1 wherein said impermeable, pressure-transmitting envelope is formed from flexible copper sheathing.

10. A method according to claim 2 wherein refractory particles are comprised substantially of graphite.

11. A method according to claim 2 wherein said preformed mass is of solid cylindrical form and said pressure-transmitting, impermeable envelope surrounds the peripheral surfaces thereof, with the refractory particles interposed in between.

12. A method according to claim 2 wherein said preformed mass is in the form of a hollow cylindrical tube and said pressure-transmitting, impermeable envelope surrounds the outer and inner peripheral surfaces thereof, with refractory particles interposed in between.

13. A method according to claim 3 wherein said gas is nitrogen.

14. A method according to claim 12 wherein the refractory particles are interposed only in-between the outer peripheral surface of the hollow cylindrical tube and the outer wall of said impermeable envelope, and at the inner surface there is direct contact between the envelope and the carbonaceous tube.

15. A method according to claim 12 wherein the refractory particles are interposed only in-between the inner peripheral surface of the hollow cylindrical tube and the inner wall of said impermeable envelope, and at the outer surface there is direct contact between the envelope and the carbonaceous tube.

16. A method of producing a carbon body from a carbonaceous preform, a portion of said preform being capable of fusing and of developing a permanent carbon bond when heated which comprises:
   A. surrounding said preformed carbonaceous mass with a deformable, pressure-transmitting, fluid-impermeable envelope;
   B. heat-treating said preformed carbonaceous mass for a time and to a temperature sufficient to evolve volatiles from within said mass while it is contained within said envelope; and,
   C. by means of a fluid pressure system, providing from about 200 to about 2200 p.s.i.g. of external pressure on said pressure-transmitting, fluid-impermeable envelope and from about 100 to about 2100 p.s.i.g. internal gaseous pressure within said envelope while said mass is heat-treated, the differential pressure varying from about 100 p.s.i.g. to about 2100 p.s.i.g., and the external pressure being greater than the internal pressure during at least a portion of the heat-treating step resulting in the application by transmission through said envelope of a mechanical pressure on said preform being heat-treated, said internal gaseous pressure being provided during at least a portion of the heat-treating time from a source independent of the evolving volatiles and being provided so as to suppress the evolution of said volatiles from the carbonaceous mass while it is so heat-treated.

17. A method according to claim 16 wherein during some portion of the heat-treating step, but before any substantial setting of the carbonaceous mass, the pressure within said envelope is about 1800 p.s.i.g., the pressure outside said envelope is about 2200 p.s.i.g., and the differential pressure between same is maintained at a minimum of about 400 p.s.i.g. until a non-fusible carbonaceous bond is developed within the carbonaceous mass.

18. A method of producing a carbon body from a carbonaceous preform, a portion of said preform being capable of fusing and of developing a permanent carbon bond when heated, which comprises:
   A. surrounding said preformed carbonaceous mass with a deformable, pressure-transmitting, fluid-impermeable envelope;

B. heat-treating said preformed carbonaceous mass for a time and to a temperature sufficient to evolve volatiles from within said mass while it is contained within said envelope;

C. by means of a fluid pressure system, providing external pressure on said pressure-transmitting, fluid-impermeable envelope and internal gaseous pressure within said envelope while said mass is heat-treated, said internal pressure being at least about 50 p.s.i.g. and also being substantially less than the pressure outside said envelope during the heating of the mass, said internal gaseous pressure being provided during at least a portion of the heat-treating time from a source independent of the evolving volatiles and being provided so as to suppress the evolution of said volatiles from the carbonaceous mass while it is so heat-treated; and D. after heating said mass to the desired elevated temperature, but before any substantial setting thereof, increasing the differential pressure.

19. A method according to claim 18 wherein said differential pressure is increased by holding the internal pressure constant and increasing the external pressure.

20. A method according to claim 18 wherein said differential pressure is increased by reducing the pressure within said envelope prior to reducing the pressure outside said envelope.

21. A method according to claim 18 wherein while heating the mass to the desired temperature the pressure within said envelope is about 1800 p.s.i.g., the pressure outside said envelope is about 2200 p.s.i.g., and the differential pressure between same is about 400 p.s.i.g.

22. A method according to claim 21 wherein after the mass is heated to the desired temperature the inner pressure is reduced sufficiently that the differential pressure is at least about 1000 p.s.i.g. before the outside pressure is reduced.

23. A method of producing a carbon body from a carbonaceous preform, a portion of said preform being capable of fusing and of developing a permanent carbon bond when heated, which comprises:

A. surrounding said preformed carbonaceous mass with a deformable, pressure-transmitting, fluid-impermeable envelope;

B. heat-treating said preformed carbonaceous mass for a time and to a temperature sufficient to develop a non-fusible, permanent carbonaceous bond within said mass while it is contained within said envelope; and, C. by means of a fluid pressure system, providing external pressure on said pressure-transmitting, fluid-impermeable envelope, and internal gaseous pressure within said envelope while said preform is heat-treated, said external pressure being greater than said internal pressure during at least a portion of the heat-treating step resulting in the application by transmission through said envelope of a mechanical pressure on said preform being heat-treated, said internal gaseous pressure being provided from a source independent of volatiles which evolve from said said fusible carbonaceous mass, and said independent internal gaseous pressure being provided so as to suppress the evolution of said volatiles from the carbonaceous mass while it is heat-treated.

References Cited by the Examiner

UNITED STATES PATENTS

| 2,010,261 | 8/1935 | Hartford | 25—144 |
| 2,132,831 | 10/1938 | Philo | 25—144 |
| 3,084,394 | 4/1963 | Bickerdike | 18—54.7 |
| 3,107,973 | 10/1963 | Bickerdike | 18—54.7 |
| 3,118,960 | 1/1964 | Cook | 264—313 |

FOREIGN PATENTS 876,924  9/1961  Great Britain.

ROBERT F. WHITE, *Primary Examiner.*

ALEXANDER H. BRODMERKEL, *Examiner.*